United States Patent [19]

Hook

[11] Patent Number: 5,487,522
[45] Date of Patent: Jan. 30, 1996

[54] MIRROR SUPPORT BRACKET

[75] Inventor: Richard R. Hook, Hudsonville, Mich.

[73] Assignee: Donnelly Corporation, Holland, Mich.

[21] Appl. No.: 159,838

[22] Filed: Nov. 30, 1993

[51] Int. Cl.[6] .................................................. F16M 13/00
[52] U.S. Cl. ........................... 248/549; 248/483; 248/900
[58] Field of Search ..................................... 248/483, 479, 248/481, 900, 484; 359/876, 872

[56] References Cited

U.S. PATENT DOCUMENTS

| | | |
|---|---|---|
| D. 192,728 | 5/1962 | Walker . |
| 541,727 | 6/1895 | Dennis . |
| 1,800,797 | 4/1931 | Hoople . |
| 1,857,095 | 5/1932 | Glowacki . |
| 1,908,767 | 5/1933 | La Hodny . |
| 1,919,475 | 7/1933 | McKinley . |
| 1,973,908 | 9/1934 | McIlwee . |
| 1,991,363 | 2/1935 | La Hodny et al. . |
| 2,052,770 | 9/1936 | Hofer . |
| 2,071,883 | 2/1937 | La Hodny . |
| 2,102,012 | 12/1937 | Hodny ................................... 248/483 |
| 2,356,432 | 8/1944 | Roedding . |
| 2,457,639 | 12/1948 | Brooks . |
| 2,469,207 | 5/1949 | Roedding . |
| 2,502,699 | 4/1950 | Budreck . |
| 2,615,368 | 10/1952 | Bindley . |
| 2,722,159 | 11/1955 | Budreck . |
| 2,763,188 | 9/1956 | Bertell . |
| 2,900,872 | 8/1959 | Mazur et al. . |
| 3,096,061 | 7/1963 | Bertell . |
| 3,104,897 | 9/1963 | Berger . |
| 3,120,369 | 2/1964 | Gray, Jr. . |
| 3,348,425 | 10/1967 | Noord ................................... 248/483 |
| 3,367,616 | 2/1968 | Bausch et al. . |
| 3,498,579 | 3/1970 | Vicary . |
| 3,507,562 | 4/1970 | Yamashita et al. . |
| 3,525,564 | 8/1970 | Barton . |
| 3,530,495 | 9/1970 | Kindel . |
| 3,554,582 | 1/1971 | Yamashita et al. . |
| 3,586,422 | 6/1971 | Kagami . |
| 3,635,435 | 1/1972 | Perison, Sr. . |
| 3,776,618 | 12/1973 | Perison, Sr. . |
| 3,988,058 | 10/1976 | Chaney et al. . |
| 4,012,022 | 3/1977 | Tomita . |
| 4,059,360 | 11/1977 | Teissier . |
| 4,066,235 | 1/1978 | Hashiguchi . |
| 4,231,898 | 8/1981 | Ochini . |
| 4,364,214 | 12/1982 | Morgan et al. . |

(List continued on next page.)

FOREIGN PATENT DOCUMENTS

| | | |
|---|---|---|
| 1000125 | 3/1956 | France . |
| 1123827 | 9/1956 | France . |
| 1171779 | 1/1959 | France ................................... 248/483 |
| 1295152 | 12/1962 | France . |
| 1504689 | 2/1969 | France . |
| 2153875 | 5/1973 | Germany . |
| 1780669 | 10/1973 | Germany . |
| 2802502 | 7/1978 | Germany . |
| 56-95944 | 7/1981 | Japan . |
| 61-41047 | 3/1986 | Japan . |
| 622692 | 8/1953 | United Kingdom . |
| 750848 | 6/1956 | United Kingdom . |
| 1008411 | 12/1971 | United Kingdom . |
| 1363070 | 8/1974 | United Kingdom . |

Primary Examiner—J. Franklin Foss
Attorney, Agent, or Firm—Price, Heneveld, Cooper, DeWitt & Litton

[57] ABSTRACT

A mirror assembly for use in vehicles having a support bracket which provides an adjustment mechanism to position the mirror under a substantially constant clamping pressure over a wide range of ambient temperature conditions. The support bracket includes a generally spherical socket which receives a polymeric ball cup substantially enclosing a ball member extending from the mirror. A spring forces the cup and ball member into the socket and causes the polymeric cup to compress about the ball member. The bracket may be used on both header- and windshield-mounted mirror assemblies, and may include an adjustable clamping member forming a portion of the socket whereby the clamping pressure may be further adjusted.

24 Claims, 5 Drawing Sheets

U.S. PATENT DOCUMENTS

| | | |
|---|---|---|
| 4,364,595 | 12/1982 | Morgan et al. . |
| 4,396,221 | 8/1983 | Morgan et al. . |
| 4,527,861 | 7/1985 | Van Duyn . |
| 4,555,166 | 11/1985 | Enomoto . |
| 4,826,289 | 5/1989 | Vandenbrink et al. . |
| 4,936,533 | 6/1990 | Adams et al. . |
| 4,957,359 | 9/1990 | Kruse ................... 248/483 X |
| 4,981,279 | 1/1991 | Andreas ................. 403/90 X |
| 5,100,095 | 3/1992 | Haan et al. . |
| 5,327,288 | 7/1994 | Wellington ............. 248/484 X |
| 5,377,949 | 1/1995 | Haan ....................... 248/900 X |

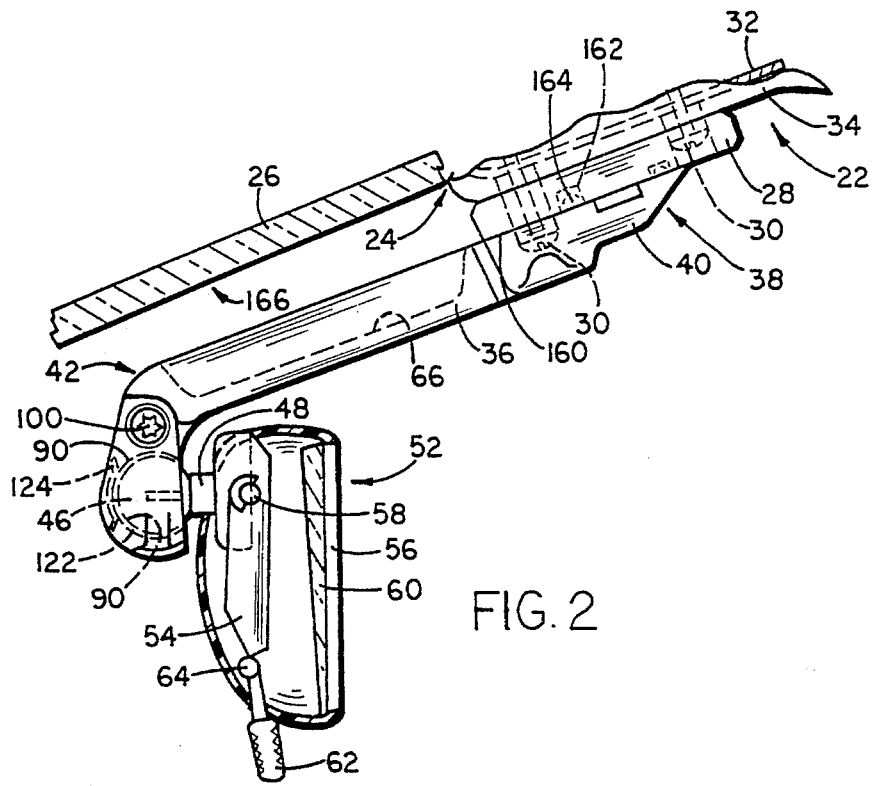
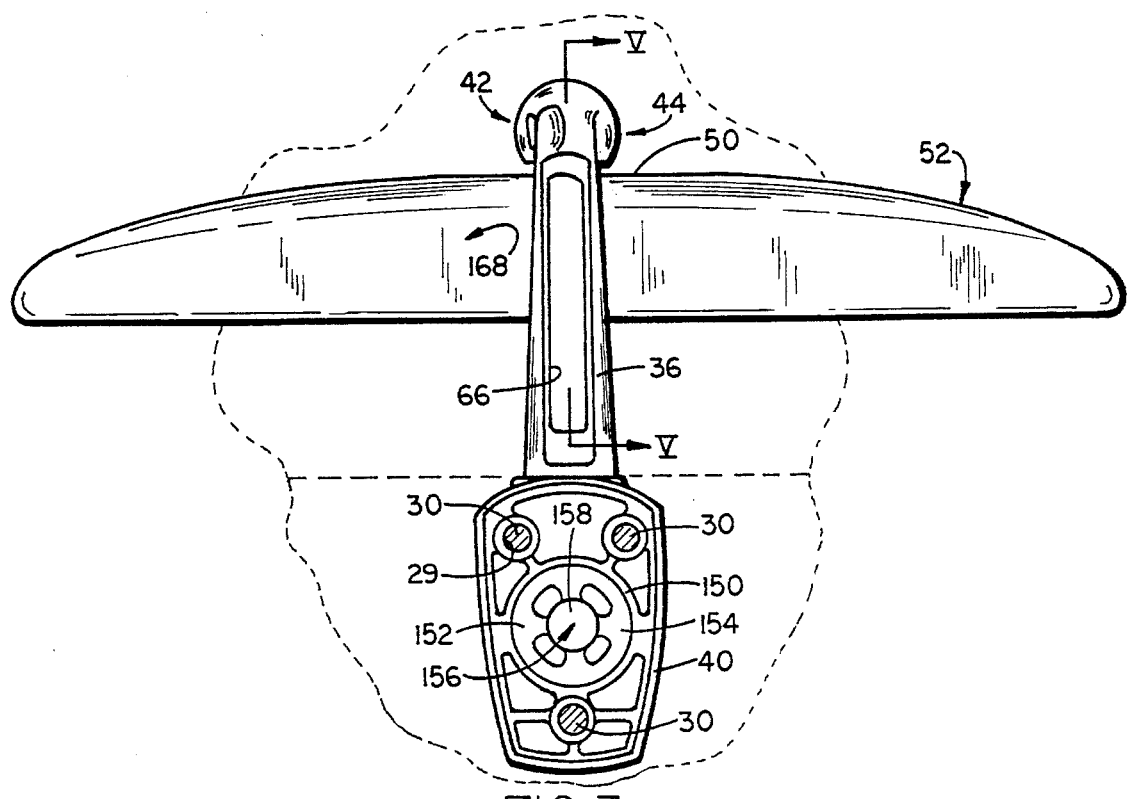

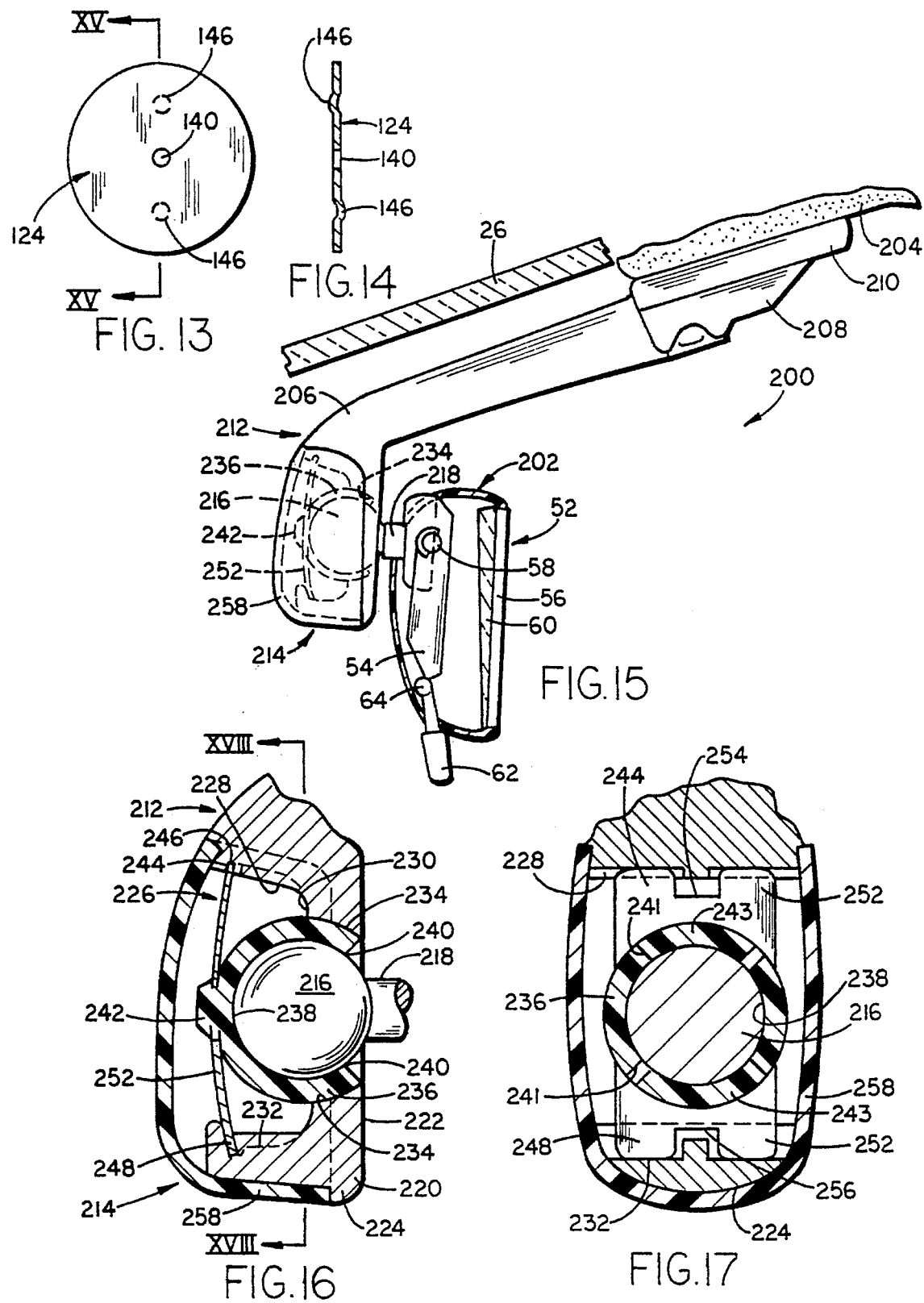

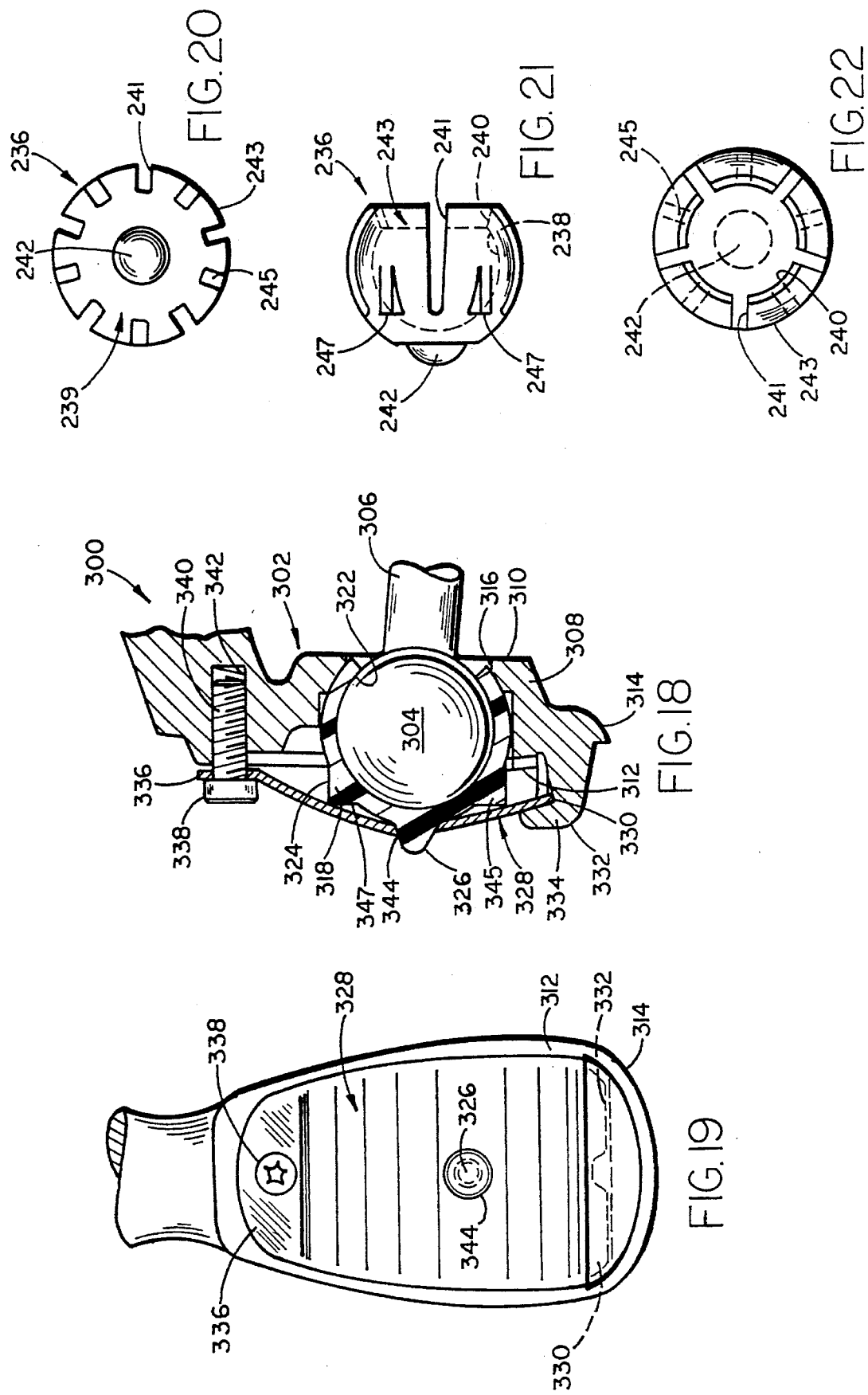

5,487,522

MIRROR SUPPORT BRACKET

FIELD OF THE INVENTION

This invention relates to mirror assemblies for use in vehicles, and more particularly to mirror support brackets having an adjustable pivot which provides a substantially constant clamping pressure over a wide range of ambient temperature conditions.

BACKGROUND OF THE INVENTION

Vehicle interior rearview mirrors are commonly secured to either the header area near the top of the windshield or directly to the inside surface of the windshield in the forward vision area of the driver. Most have a ball member either extending from or into the mirror body to enable pivotal adjustment of the mirror. In one prior-known mirror having a ball member extending out of the mirror, the ball is captured in one end of a swaged tube. A helical compression spring is disposed in the tube and engages a disk which, in turn, engages the ball member. The disk has a portion which partially conforms to the shape of the ball. Often a similar structure is duplicated at the opposite end of the tube to connect the mirror to a mounting member. In addition, a cup member can be substituted for the disk. Such structures are disclosed, for example, in U.S. Pat. Nos. 3,367,616 to Bausch et al.; 3,635,435 to Perison, Sr.; 4,936,533 to Adams et al.; and 5,100,095 to Haan et al. Such "double ball" mirror support assemblies are typically fixed to the interior surface of the windshield.

A substantial number of other rearview mirrors are header-mounted mirrors. Examples of such assemblies are disclosed in U.S. Pat. Nos. 4,012,022 to Tomita; 4,066,235 to Hashiguchi; and 4,826,289 to Vandenbrink et al. In substantially each instance, a ball member extending from the mirror stay or support arm is received in a socket within the rearview mirror assembly itself, such socket being formed either by the mirror housing or by a pair of cooperating spaced apart plates. In either case, threaded fasteners draw the socket or spaced plates together within the mirror assembly to exert pressure on the ball to hold the mirror in a desired position. These fasteners are typically inaccessible for adjustment.

In each of the mirror assemblies described above, the clamping pressure on the ball is fixed at the instant it is assembled. As temperature increases or decreases, the clamping pressure changes as a direct result of the different coefficients of expansion and contraction of the materials. On one day, the ball joint may be stiff and difficult to adjust; while on other days the mirror may be loose and not stay in place.

Another disadvantage of the mirror assemblies described above is the inability to interchange mirror heads. When a ball pivot extends from the mirror mounting arm into the mirror housing, the housing must be specifically designed to accept that ball member on a permanent basis. Changing support arms for specific mirror heads and vice-versa without partial destruction of the mirror was impossible. Furthermore and related thereto is the inability to replace one of the components of the mirror assembly if it breaks; consequently, the entire mirror assembly is usually replaced. The desire to change mirror heads, stays, or replacement parts results in a replacement of otherwise perfectly good components and increases cost to the consumer.

SUMMARY OF THE INVENTION

The present invention provides a rearview mirror support bracket for vehicles having an adjustable pivot capable of receiving one of a number of rearview mirror heads and provides a substantially constant clamping pressure through a range of ambient temperature conditions.

Generally, the present invention includes a mirror stay or support arm, preferably having one end attached to the vehicle by a breakaway, detachable coupling which allows the stay to separate upon the application of a predetermined force. The opposite end of the support arm includes a ball-mount retention assembly. The assembly includes a socket for receiving the ball mount extending from the mirror. The ball mount is substantially enclosed by a compressible cup which frictionally engages the ball mount. A spring at one end of the cup and engaging the mirror stay forces the cup in a direction on the socket which, in turn, forces the cup tighter about the ball mount.

In one embodiment, the bracket assembly includes a stay with a socket formed at one end by cooperating hinged portions. A cup disposed in the socket also substantially encloses the ball extending from the mirror. The ball and cup are clamped in the socket by the cooperating hinged portions. A biasing member is disposed in the socket to force the cup and enclosed ball against one end of the socket to compress the cup tightly about the ball. The spring and cup together maintain a substantially constant clamping pressure on the ball through a wide-range of temperatures.

In a preferred embodiment of the invention, the socket is defined by opposing depressions: one in a fixed end of the mirror stay, and the other in a cap to engage the fixed end. The cap has a hole in one end to receive a hook extending from the fixed end. A screw secures an opposite end of the cap to the stay. The ball member extending from the mirror is substantially enclosed by a polymeric cup which, in turn, is received in the socket. The cup includes a plurality of movable segments which clamp against the ball when compressed. A spring is disposed at one end of the cup opposite an opening accepting the ball, to force the cup against the opening and force the segments against the ball, thereby exerting a substantially constant clamping force on the ball.

In an alternate embodiment of the invention, the stay has one end attached to the vehicle and the opposite end terminates in a dependent housing having a generally oval peripheral edge. A recess is defined on an opposite or back side and is concealed by a cover. A hole extends through the housing large enough to allow the ball mount to pass therethrough. A cup member disposed on the recess side of the housing substantially encloses the ball mount and prevents the ball from being withdrawn through the hole. The cup includes a plurality of segments which compress about the ball mount when forced against the hole. A spring at the back of the cup and anchored in the recess forces the cup against the hole and maintains a substantially constant clamping pressure on the ball mount.

Preferably, each embodiment of the bracket assembly also includes a breakaway mounting assembly, which allows the support bracket to release from the vehicle header or other vehicle portion to which the bracket is secured upon sustaining a predetermined impact force such as during an accident.

As will be understood, the present invention provides numerous advantages over prior mirror support brackets. The mirror bracket assembly exerts a substantially constant clamping pressure on the ball extending from the mirror over a wide range of ambient temperature conditions. The mirror bracket also accepts a wide array of mirror head types without replacing the bracket. The clamp assembly, internal cup, and spring can also adapt balls of different sizes to the bracket. The clamp assembly can also be easily incorporated in conventional breakaway header- or windshield-mounted mirror assemblies, which allow the support and rearview mirror to release from the vehicle.

BRIEF DESCRIPTION OF THE DRAWING FIGURES

A better understanding of the invention and the advantages provided thereby may be obtained by reference to the specification and the attached drawing figures, wherein:

FIG. 2 is a fragmentary, side elevational view of the mirror assembly shown in FIG. 1;

FIG. 3 is a top view of the mirror assembly;

FIGS. 10–13 are front, side, and sectional views, respectively, of one embodiment of a cup used in this invention;

FIGS. 13 and 14 are front and sectional views of one embodiment of a spring used in this invention; and FIGS. 15–17 are fragmentary sectional views of an alternate embodiment of the invention.

DETAILED DESCRIPTION OF THE PREFERRED EMBODIMENT

Figure 1:
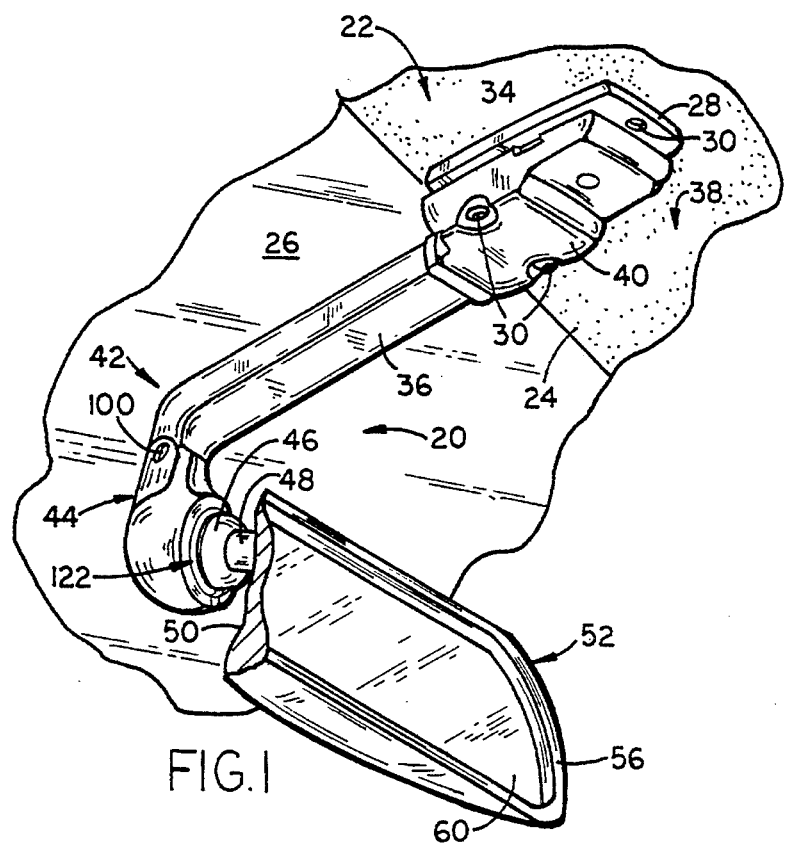
FIG. 1 is a fragmentary, perspective view of a header-mounted mirror assembly incorporating one embodiment of the invention and installed on a vehicle.

Referring to the drawing figures, mirror assembly 20 is shown mounted to an interior header 22 of a vehicle close to the upper edge 24 of windshield 26. Assembly 20 is attached to header 22 by a securing member 28 retained by screws 30 extending therethrough and extending into sheet metal 32 concealed by headliner 34 (FIG. 2). Attached to securing member 28 and dependent therefrom is a mirror stay or support arm 36 having a first end 38 forming a base 40. Base 40 is preferably coupled to securing member 28 using a breakaway connection, such as described in greater detail below. Another example of such a coupling is disclosed in commonly assigned U.S. Pat. No. 5,100,095 to Haan et al. The coupling between base 40 and securing member 28 allows separation of base 40 from member 28 should an impact occur.

As an alternative to securing member 28 attached to header 22 as seen in FIG. 1, member 28 and base 40 may be attached to the interior surface of windshield 26 by a conventional mounting button adhered to the windshield surface by a layer of conventionally known metal-to-glass adhesive such as a polyvinyl butyral available from Monsanto Company of St. Louis, Mo. Securing member 28 would then be designed to be slidably received over the mounting button to suspend mirror assembly 20 from windshield 26.

An opposite end 42 of stay 36 terminates in a ball-mount retention assembly 44. Assembly 44 receives a ball member 46 disposed at one end of an arm 48 extending from the back 50 of mirror 52 such as disclosed in commonly assigned U.S. Pat. Nos. 4,936,533 to Adams et al. and 5,100,095 to Haan et al. Referring to FIG. 2, ball member 46 projects from a day/night pivot actuator 54 rotatably mounted within rearview mirror housing or frame 56 on upper pivot shaft 58. Frame 56 encloses and retains a prismatic mirror element 60 having nonparallel front and rear surfaces. A pivot lever 62, supported on a lower pivot shaft 64 and joined integrally to the lower edge of pivot actuator 54, may be moved back and forth to pivot frame 56 and prism 60 between day and night reflective positions about shaft 58. In the day position, substantially all of the light incident upon the second, reflective coated, rear surface of the prism from the rear of the vehicle is reflected to the eyes of the driver. In the night position, when the mirror case and prism are pivoted about shaft 58, a significantly reduced amount of light is reflected from the non-reflective coated front surface of prism 60, thereby reducing glare and improving the driver's night vision.

To reduce the weight of mirror assembly 20, lightweight yet rigid materials are used to make the various components. For example, it is preferred that securing member 28, mirror frame 56, pivot actuator 54, and pivot lever 62 be formed from a polymeric material. Mirror stay 36 is preferably die cast from S.A.E. zinc 925, although aluminum, or other relatively lightweight materials, could also be used. Further cost savings and structural benefits are obtained by a recess 66 extending substantially the length of stay 36, extending inwardly from a side closest to windshield 26. Recess 66 substantially parallels the longitudinal axis of stay 36 and defines lateral walls terminating in end walls proximate each end of stay 36. Lateral walls essentially act like I-beams, providing the strength while reducing a substantial amount of material and weight from stay 36.

Figure 4:
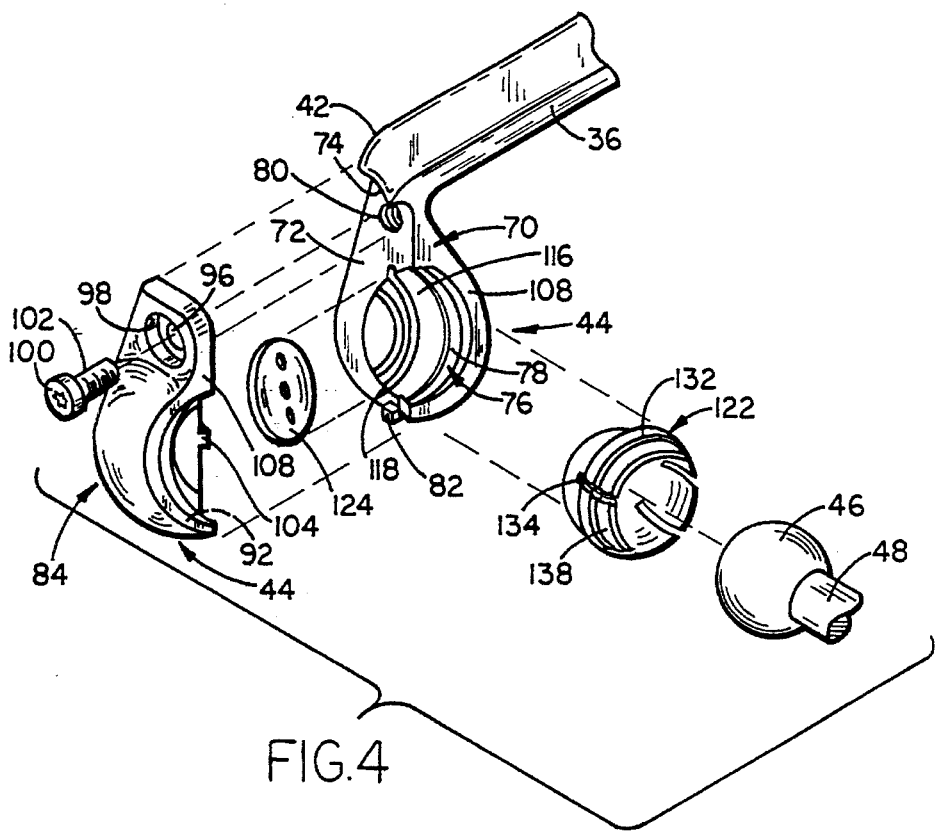
FIG. 4 is a fragmentary, exploded view of one embodiment of the invention shown in FIGS. 1–3.
Figure 5:
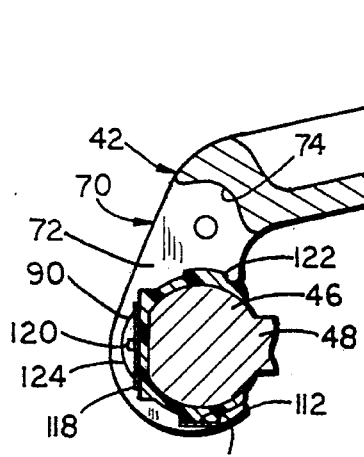
FIG. 5 is a fragmentary, side-section view of the embodiment of the invention in FIG. 4.
Figure 6:
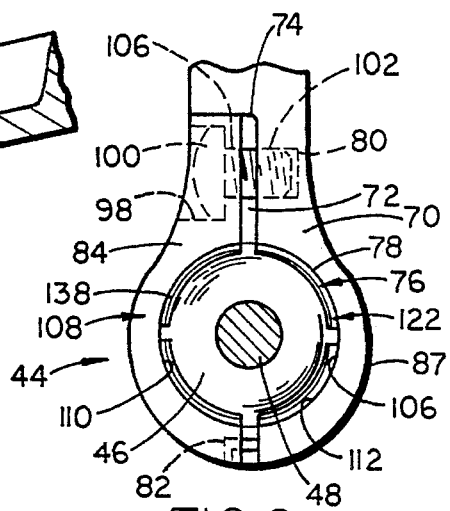
FIG. 6 is a fragmentary, front-elevational view of the embodiment of the invention in FIG. 4.

Referring now to FIGS. 4–6, one embodiment of retention assembly 44 includes a fixed jaw portion 70 extending from end 42 and having a lateral, flat surface 72 contained substantially in a plane including the longitudinal axis of stay 36. Surface 72 extends toward second end 42 before terminating in a shoulder 74. Surface 72 includes a generally hemispherical depression 76 formed by wall 78. Between shoulder 74 and depression 76 is a threaded hole 80 which extends into surface 72 to receive a threaded fastener described below. Located at the lower end of surface 72, below depression 78, is a hook, finger, or tenon 82 for reasons which will become apparent below.

Figure 7:
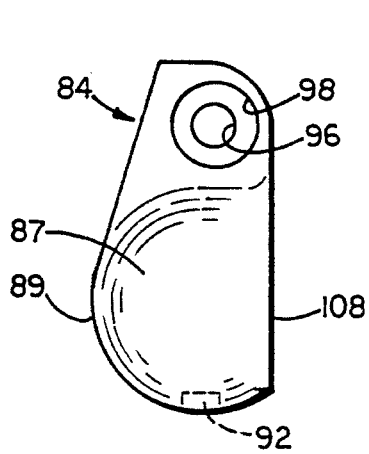
FIGS. 7–9 are side and front views of one embodiment of a cap used in this invention.
Figure 8:
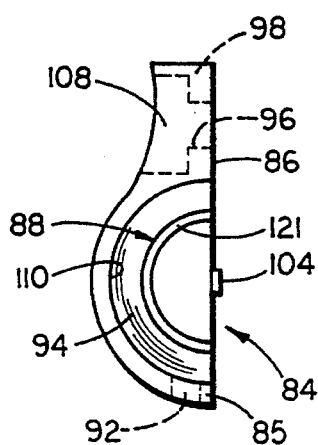
Figure 9:
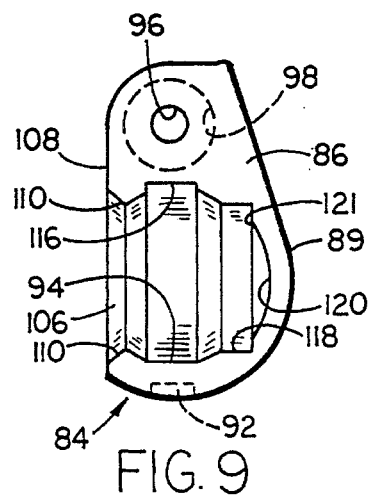

Cooperating with fixed jaw 70 and engaging surface 72 is a cap 84 generally constituting a mirror image of fixed jaw 70 from shoulder 74 downward (FIGS. 7–9). Cap 84 is preferably die cast from S.A.E. 903 or 925 zinc, although other materials may also be used. Cap 84 includes a surface 86 containing a generally hemispherical depression 88, which when coupled to fixed jaw 70, defines a generally spherical cavity or socket 90 shown in FIGS. 2 and 5. Below depression 88 is a hole or mortise 92 extending through wall 94 and separated from surface 86 by a bridge 85 and adapted to receive hook or tenon 82 described above. Above depression 88 and extending through cap 84 is hole 96 aligned with hole 80 in jaw 70. Hole 96 includes a recess 98 on the opposite side to receive and recess the head 100 of threaded fastener 102 extending therethrough and received in threaded hole 80 (FIGS. 4, 6). Located behind depression 88 and extending approximately 0.25 to 0.75 millimeter (mm) perpendicularly from surface 86, is boss 104, which provides a uniform space between the rear edge 89 of cap 84 and the cooperating edge on the fixed jaw 70. The exterior surfaces and profiles 87 of cap 84 and fixed jaw 70 are generally identical, mirror images of each other to form the generally spherical clamp assembly 44 and provide sufficient room for socket 90.

Referring to FIGS. 4–6, socket 90 is accessible through an opening 106 formed in front surface 108 of clamp 44 by cooperating edges 110, 112. Opening 106 is such to allow reasonable room for the vehicle operator to adjust mirror 52, yet retain ball member 46 therein, and with a dimension less than the diameter of ball 46 to prevent ball member 56 from escaping when assembled. The inner surface of socket 90 defined by interior wall 114 is generally spherical and contains a pair of cylindrical grooves 116, 118 formed therein and concentric with one another. Groove 116 is preferably contained in a plane substantially parallel to front surface 108 and located along the greatest diameter of socket 90. Groove or channel 118 is parallel to groove 116 and located between groove 116 and the bottom or back wall 120 (FIG. 9). Channels 116, 118 in socket 90 receive and retain cup 122 and a disk-shaped spring 124, respectively, both described below.

Cup 122 (FIGS. 10–12) is preferably formed from a polymeric material, most preferably on acetal resin which is a hard, tough plastic often used as a substitute for many metals. A preferred acetal resin is Celcon UV-90 available frown Hoechst-Celenese of Chatham, N.J. Cup 122 is preferably molded having a substantially smooth spherical interior wall 126 designed to closely conform to ball member 46 received therein through opening 128 having generally the same dimension as does opening 106. The exterior wall 130 is also generally spherical in form to conform to the interior 114 of socket 90. Extending from exterior wall 130 is a circumferential flange 132 contained in a plane substantially parallel to opening 128. Flange 132 is dimensioned to be received in socket groove 116. In a preferred embodiment, cup 122 contains a plurality of slots 134, preferably four, extending from opening 128 to a point slightly beyond flange 132. Slots 134 are preferably equidistant from each other and are contained in two imaginary planes intersecting each other at a right angle. Slots 134 define an equal number of cup segments 138 which are able to flex to increase and decrease the interior diameter of wall 126 as well as the size of opening 128.

Spring 124 (FIGS. 13, 14) is a disk-like member preferably formed from spring steel and most preferably S.A.E. 1050 annealed spring steel, heat treated by the process of austempering. The steel is most preferably finished with zinc plate and black di-chromate to prevent corrosion. The spring is preferably circular in shape and of a dimension to fit within channel 118 in socket 90. A hole 140 is formed in the spring 124, passing through the center thereof, to receive a projection 142 extending from a flat 144 (FIGS. 11, 12) at the back of cup 122 such that spring 124 lies adjacent flat 144. Spring 124 may also contain one or more dimples 146 to aid in separating each disk after manufacturing. Although spring 124 is described as a circular disk, other spring shapes may also be employed including rectangular, square, hexagonal, cross-shaped, leaf, or coiled springs.

Referring again to FIGS. 5, 6, ball member 46 is pressed into the interior 126 of cup 122 by inserting ball 46 through opening 128, spreading cup segments 138 apart in doing so. Spring 124 is attached to the back 144 of cup 122 by projection 142 extending through hole 140. Cup 122 and ball member 46 are placed in the disassembled socket 90 such that circumferential flange 132 is located in channel 116.

Spring 124 is received in channel 118 such that the peripheral edge of the spring engages shoulder 121 and the center of the spring is spaced from back 120. Cap 84 is aligned with fixed jaw 70, with hole 92 receiving hook 82 and aligned so that spring 124 and cup flange 132 are located in their respective channels. Screw 102 is inserted through hole 96 and threaded into hole 80 in fixed jaw 70, and adjusted to clamp cup 122 and cup segments 138 about ball member 46. Spring 124 disposed in the bottom of socket 90 forces cup 122 forward in socket 90 against lip 110 which, in turn, causes cup segments 138 to be further compressed about ball member 46. The conformance of cup interior 126 to the exterior of ball member 46, the adjustable clamping action of cap 84 with jaw 70, and spring 124 acting on cup 122, combine to provide a frictional coupling which exerts a substantially constant clamping action on ball member 46 through a wide range of ambient temperature.

The clamping force may be adjusted by screw 102 forcing the end of clamping plate or cap 84 against the upper end of fixed jaw 70. The fixed points established by hook 82 in hole 92, and boss 104 extending from cap 84, cause socket 90 to close about the end having opening 106. The compression of socket 90 at the end containing opening 106 forces cup segments 138 tightly inward against ball member 46 to place more friction on ball member 46 if necessary. Compression of cup 122 at opening 106 tends to move cup 122 back away from opening 106. However, spring 124 at the back of cup 122 reacts by forcing cup 122 toward opening 106. The result is a substantially constant clamping pressure on ball member 46.

Referring to FIGS. 15–17, an alternate embodiment of mounting system 200 for attaching a rearview mirror 202 to a vehicle header 204 includes a mirror stay or support arm 206 having a first base end 208 detachably coupled to a securing member 210 which, in turn, is fixed to the vehicle header 204. Base 206 may be attached to securing member 210 in a number of ways and is preferably coupled in a manner such that base 208 breaks away or releases from securing member 210 upon a substantial force exerted upon stay arm 206.

The opposite end 212 of stay arm 206 terminates in a ball-mount retention assembly 214. Assembly 214 receives and retains a ball member 216 at an end of a ball arm 218 extending from the back of the rearview mirror 202, such as disclosed in U.S. Pat. Nos. 4,936,533 and 5,100,095. Ball member 216 projects from a day/night actuator 54 rotatably mounted on shafts 58, 64 within the mirror housing or frame 56 as described above.

Ball-mount retention assembly 214 includes a housing 220 having a generally flat front surface or face 222 with a generally oblong or oval peripheral edge 224. Opposite face 222, on a back of assembly 214, is a recess 226 having an upper shoulder 228, a floor 230 generally parallel to face 222, and a lower flange 232. Formed in floor 230 and extending through to face 222 is a spherical hole or socket 234 having a larger diameter in floor 230 than in face 222. The diameter of socket 234 in face 222 is sufficiently large to pass ball member 216 therethrough.

Capturing and substantially surrounding ball member 216 in recess 226 is a ball cup 236 preferably formed from a polymeric material, and most preferably an acetal resin such as Celcon UV-90 described above. Cup 236 has a substantially smooth spherical inner-wall 238 designed to conform closely to ball member 216 received therein through opening 240. The outer surface 239 of cup 236 adjacent cup opening 240 conforms closely to the spherical surface defining socket 234. On cup 236 opposite opening 240 is a projection 242 to be used to properly position and sustain the position of cup 236 in socket 234.

In the preferred embodiment, cup 236 includes a plurality of slots 241 which extend from opening 240 partially back toward projection 242. Slots 241 are preferably spaced equidistant from each other to define a like number of cup segments 243. Each segment 243 is designed to expand and increase the size of opening 240 to allow ball member 216 into the spherical chamber formed by wall 238. Each segment is also designed to be forced inwardly against ball member 216 by socket 234 when cup 236 is pushed from behind by spring 252. The compression of the segments about ball member 216 increase the friction, and, as a result, retain rearview mirror 52 in position.

Received about projection 242 and having a first end 244 engaging a slot 246 in top wall 228 and an opposite end 248 received in a slot 250 in flange 232 is a spring 252, forcing cup 236 into socket 234. Spring 252 is preferably generally rectangular in shape and made from S.A.E. 1050 annealed spring steel, austempered to provide optimum behavioral characteristics. Spring 252 is most preferably finished with zinc plating and black di-chromate to prevent corrosion. Formed at each end 244, 248 are slots 254, 256 to allow a tool to bend and compress spring 252 so as to engage the slots 246, 250 in recess 226.

Concealing recess 226 and fitting generally flush with peripheral edge 224 and the exterior surface of stay 206 is a cover 258. It is preferred that cover 258 be molded from a polymeric material such as PVC and have a shape, texture, and color that conforms and blends with that provided on stay 206. Cover 258 is intended to attach securely to the retention assembly 214, yet be easily removed in order to remove spring 252 and allow the replacement of mirror 202, without the need to replace stay 206.

Referring back to FIGS. 1–3, it is intended that any embodiment of the invention be used in conjunction with what is known as a "break-away" mirror mounting assembly such as disclosed above, or in Japanese publication 57-55239. As shown in the drawing figures, securing member 28 includes a recess 150 for retaining a spring washer 152 having inwardly projecting fingers 154. Extending through the center of washer 152 is a bolt 156 with the head 158 engaging fingers 154. The threaded end of bolt 156 is received in stay base 40 to hold base against securing member 28. The lower surface 160 of securing member 28 contains a plurality of recesses 162 to be engaged by a like number of projections 164 extending from base 40. When an impulsive force tending to rotate stay 36 in a direction indicated by arrow 166 (FIG. 2), or in a direction indicated by arrow 168 (FIG. 3) where bolt 156 is the pivot point, bolt head 158 is drawn through the fingers 154 of spring washer 152 and stay 36 separates therefrom, absorbing the forces causing the separation.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A single ball joint support bracket for a vehicle rearview mirror housing, the mirror housing having a ball member extending therefrom, comprising:

a mirror stay having a first end terminating in a single, generally spherical, ball joint socket;

a cup, substantially enclosing the ball member extending from the mirror housing, disposed within said generally spherical ball joint socket, and having a rear surface; and a biasing member disposed in said generally spherical, ball joint socket behind said cup, to force said cup toward one end of said socket and compress about the ball to sustain a substantially constant clamping force on the ball through a range of ambient temperatures, said biasing member including at least one of a disk, rectangular, square, hexagonal, leaf, and coil spring.

2. A support bracket for a vehicle rearview mirror housing, the mirror housing having a ball member extending therefrom, comprising:

a mirror stay having a first end terminating in a generally spherical socket, said socket being defined by a first portion from said first end, and a second cooperating portion coupled to said first portion;

a cup substantially enclosing the ball member extending from the mirror housing, and disposed within said generally spherical socket; and a biasing member disposed in said generally spherical socket behind said cup, to force said cup toward one end of said socket and compress about the ball to sustain a substantially constant clamping force on the ball through a range of ambient temperatures.

3. The mirror support as defined in claim 2, wherein said cup is retained in said socket between said first and second portions.

4. The mirror support as defined in claim 3, including an adjustable fastener for drawing said first portion toward said second portion to tighten said cup about the ball member.

5. The mirror support as defined in claim 2, wherein said stay includes a second end attached to a substrate.

6. The mirror support as defined in claim 5, wherein said substrate includes a vehicle.

7. The mirror support as defined in claim 6, wherein said substrate includes a headliner.

8. The mirror support as defined in claim 6, wherein said substrate includes a windshield.

9. The mirror support as defined in claim 2, wherein said first portion includes a generally hemispherical depression having a convex outer surface and a corresponding concave inner surface.

10. The mirror support as defined in claim 9, wherein said second portion includes a generally hemispherical cap member having a convex outer surface and a corresponding concave inner surface, and attached to said first portion to form said socket.

11. A rearview mirror assembly for a vehicle, comprising:

a mirror housing having a back;

a ball member extending from said back of said mirror housing;

a mirror stay having first and second ends, said first end attached to the vehicle, said second end defining a first portion of a generally spherical clamp;

a clamping member defining a second portion of said generally spherical clamp detachably coupled to said first portion and cooperating with said first portion to define a socket;

a ball cup disposed about said ball member and received within said socket, said cup having at least one segment compressible about said ball member by said clamp; and a biasing member disposed between said ball cup and said socket for urging at least one segment about said ball member.

12. The mirror assembly as defined in claim 11, wherein said coupling of said second portion of said generally spherical clamp to said first portion includes a hinge assembly.

13. The mirror assembly as defined in claim 11, wherein said coupling of said second portion of said generally spherical clamp is coupled to said first portion includes a threaded fastener.

14. The mirror assembly as defined in claim 12, wherein said hinge assembly includes:

a hook member extending from at least one of said first portion and said second portion of said generally spherical clamp; and a slot defined in a remaining one of said first and second portion of said generally spherical clamp to receive said hook member.

15. The mirror assembly as defined in claim 14, further including an adjustable fastener at an end opposite said hook member and slot for moving said clamping plate against said first portion to increase clamping pressure on said ball cup and ball member.

16. The mirror assembly as defined in claim 11, wherein said ball cup includes:

a molded polymeric, generally spherical sleeve having an opening for receiving said ball member, said sleeve conforming closely to said ball member;

at least one slot formed in said sleeve and extending from said opening to define at least one compressible cup segment; and a flange extending from an exterior surface of said ball cup for positioning said ball cup in said socket.

17. The mirror assembly as defined in claim 11, wherein said ball cup includes a member extending from an exterior surface thereof for positioning said biasing member with respect thereto and in said socket.

18. The mirror assembly as defined in claim 17, wherein said biasing member includes a spring.

19. The mirror assembly as defined in claim 18, wherein said member extending from said ball cup exterior includes a flange; said socket formed by said clamping plate including at least one channel formed in an interior wall thereof to receive said flange extending from said ball cup and a recess for receiving said spring.

20. A breakaway rearview mirror assembly for a vehicle, comprising:

a securing member attached to the vehicle;

a support arm having a first and second ends;

a breakaway coupler extending through said securing member for releasably coupling said first end of said stay to said securing member and allowing said coupler to release and separate from said securing member upon impact by a force of predetermined magnitude acting on said stay;

a ball-mount retention assembly defined at said second end of said support arm and defining a generally spherical cavity having an opening therein;

a compressible liner cup disposed within said spherical cavity;

a spring disposed between said spherical cavity and said compressible liner cup opposite said opening; and a ball mount extending from a rearview mirror, said ball mount being received in said liner cup through said opening and clamped in place in said spherical cavity by said compressible liner cup and spring.

21. The breakaway rearview mirror assembly as defined in claim 20, wherein said ball-mount retention assembly includes:

a fixed jaw defined on said second end of said stay and containing a depression;

a moving jaw attached to said fixed jaw and containing a depression; and said spherical cavity defined by the cooperation of the depression in each jaw.

22. The breakaway rearview mirror assembly as defined in claim 21, further including an adjustable fastener for drawing said moving jaw toward said fixed jaw to tighten said cavity about said liner cup.

23. The breakaway rearview mirror assembly as defined in claim 20, wherein said ball-mount retention assembly includes:

a fixed portion dependent from said second end of said stay having a face on one side and a recess on a second and opposite side;

a hole extending through said fixed portion and having a sphere conforming inner surface and having a dimension to freely receive said ball mount therethrough;

said liner cup disposed on said recess and receiving said ball mount therein, said liner cup having a generally spherical surface engaging said inner surface of said hole; and said spring disposed in said recess and engaging said liner cup for forcing said liner cup into said hole and clamping said liner cup about said ball mount.

24. The breakaway rearview mirror assembly as defined in claim 23, further including a cover received over said recess and concealing said spring and liner cup.

* * * * *

UNITED STATES PATENT AND TRADEMARK OFFICE
CERTIFICATE OF CORRECTION

PATENT NO. : 5,487,522
DATED : January 30, 1996
INVENTOR(S) : Richard R. Hook

It is certified that error appears in the above-indentified patent and that said Letters Patent is hereby corrected as shown below:

On the title page sheet "5 Drawing Sheets" should be --4 Drawing sheets--

In the drawings:
    Delete Figs. 18-22 in their entirety.

Figures 10, 11:
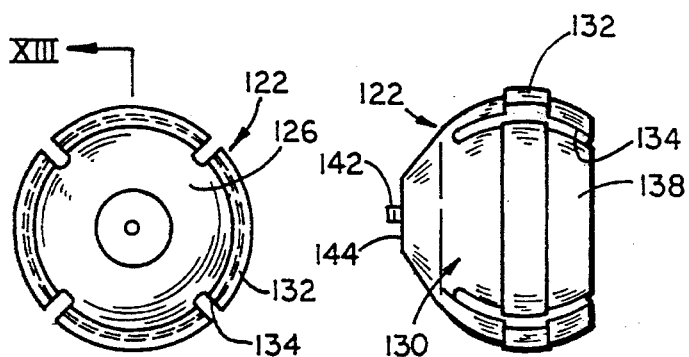
Figure 12:
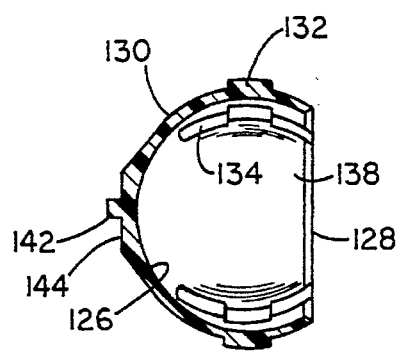

Column 3, line 31:

"Figs. 10-13" should be --Figs 10-12--

Signed and Sealed this

Twenty-fourth Day of June, 1997

Attest:

BRUCE LEHMAN

Attesting Officer

Commissioner of Patents and Trademarks